United States Patent [19]

Weiner et al.

[11] Patent Number: 4,702,508

[45] Date of Patent: Oct. 27, 1987

[54] LIFTING CLAMP CAM WEAR INDICATOR AND METHOD

[75] Inventors: Jerome Weiner, Teaneck, N.J.; Moon Choung, Bayside, N.Y.

[73] Assignee: Cooper Industries, Houston, Tex.

[21] Appl. No.: 917,766

[22] Filed: Oct. 10, 1986

[51] Int. Cl.[4] ........................ B66C 1/48; G01D 21/00

[52] U.S. Cl. .................................... 294/101; 116/208; 294/902

[58] Field of Search ..................... 294/86.4, 101, 103.1, 294/104, 901, 902; 73/162; 116/208; 152/154.2; 269/285

[56] References Cited

U.S. PATENT DOCUMENTS

| | | | |
|---|---|---|---|
| 1,351,530 | 8/1920 | Meals | 294/101 |
| 2,393,101 | 1/1946 | Gardner | 294/104 |
| 2,706,509 | 4/1955 | White | 116/208 X |
| 3,384,145 | 5/1968 | Wolfer | 152/154.2 |
| 3,414,272 | 12/1968 | Rogers | 116/208 X |
| 4,226,274 | 10/1980 | Awaya et al. | 152/154.2 |
| 4,641,877 | 2/1987 | Merrill | 294/101 |

FOREIGN PATENT DOCUMENTS

| | | | |
|---|---|---|---|
| 1480472 | 5/1967 | France | 116/208 |
| 1279966 | 6/1972 | United Kingdom | 116/208 |

*Primary Examiner*—Johnny D. Cherry

*Attorney, Agent, or Firm*—E. E. Scott; A. R. Thiele

[57] ABSTRACT

A plate lifting clamp has an eccentric cam with spaced apart rounded teeth having sharp crested edges which are provided with gauge marks extending into each tooth. Excessive wear on the teeth may be visually observed by comparing the worn portion of each tooth to the location of the gauge marks.

3 Claims, 5 Drawing Figures

Fig. 2
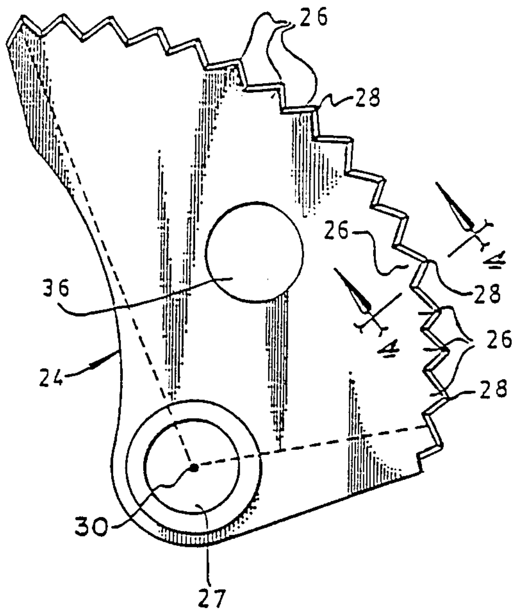
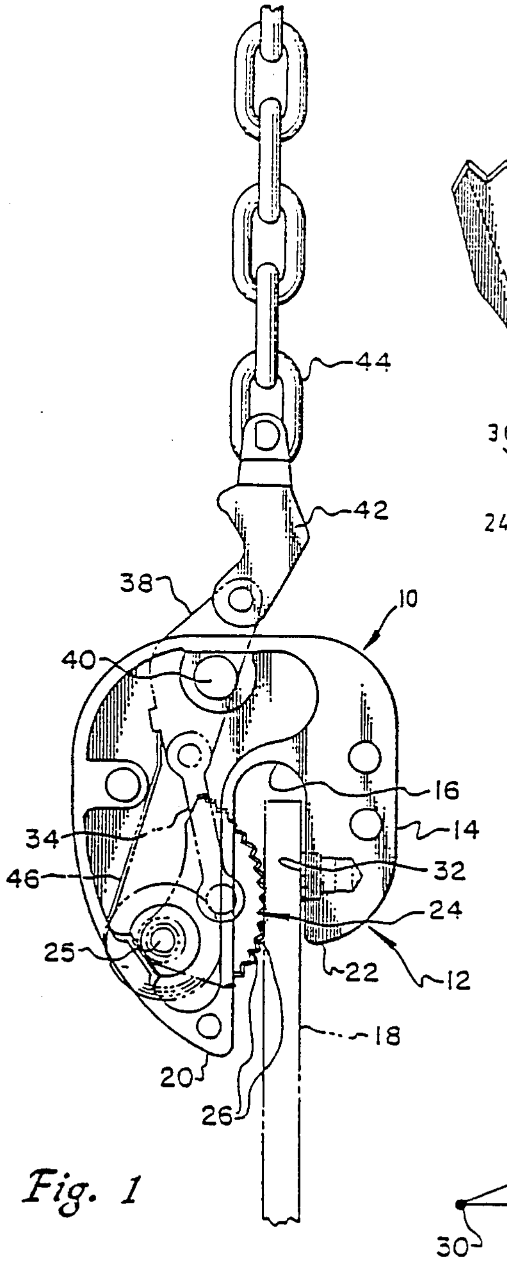
Fig. 1
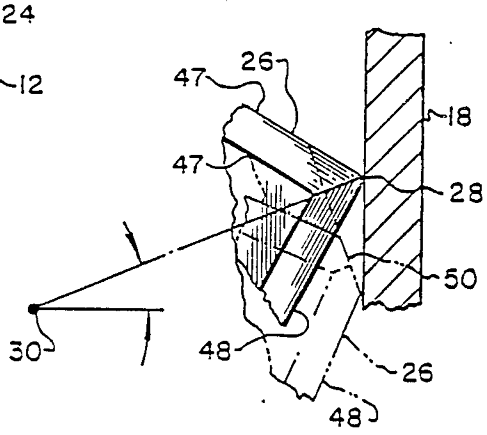
Fig. 3

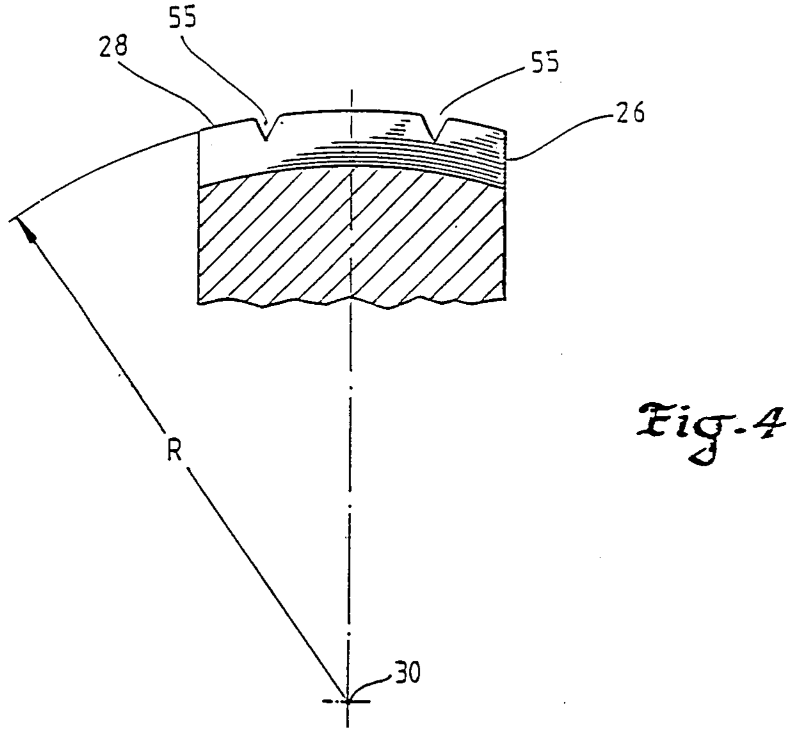
Fig-4
Fig.5
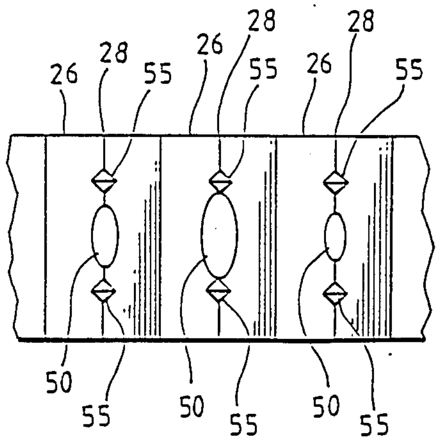

LIFTING CLAMP CAM WEAR INDICATOR AND METHOD

BACKGROUND OF THE INVENTION

1. Field of the Invention

The present invention pertains to lifting clamps for use in lifting and conveying metal plate and other structural elements and more specifically the present invention pertains to a tooth wear indicator and method for use with lifting clamps.

2. Background

Lifting clamps typically have an eccentric cam with a curved surface. The curved surface includes a number of rounded serrations or teeth. These rounded serrations or teeth hold the element being lifted by biting into a surface. The holding force exerted by the lifting clamp is increased in direct proportion to the lifting or conveying effort exerted. The greater the lifting force, the greater the holding force and consequently, the greater the wear on the cam teeth.

Lifting clamps designed for lifting and conveying heavy metal plates, various metal structural shapes and other elements such as material storage drums are subject to rough handling and rapid wear. Such rapid wear is caused by the stressful nature of their use. These lifting clamps are typically used in harsh environments where abrasive or corrosive materials are often caught between the cam teeth and the element being lifted. These corrosive or abrasive materials contribute to the rapid wear of the gripping teeth on the cam portion of the lifting clamp.

Since lifting clamps are normally found in applications employing relatively unskilled laborers, it is preferable that a convenient and easy to use wear indicator be provided for the rounded serrations or teeth on the cam surface. Such a wear indicator should provide a quickly read measure of tooth wear for the clamp user so that worn cams in lifting clamps can be replaced before a dangerous condition occurs.

When tooth wear approaches a point which would diminish the cam tooth penetration or the bite into the element being lifted, the lifting capability of the clamp is reduced to a potentially dangerous level. Such a dangerous situation is particularly critical if a worn clamp is used with an abnormally heavy load. Accordingly, an effective wear indicating system may substantially reduce the risk of serious injury or death.

A problem associated with most wear indicating systems relates to the relative difficulty associated with inspecting the teeth once the cam is mounted in the lifting clamp. Typically, the type of clamp with which the present invention is used includes a somewhat inverted "U" shaped jaw. The cam is supported within the inverted "U" shaped jaw for pivotal movement, which movement is used to urge the cam into gripping engagement with the plate or structural member being lifted. The cam in the lifting clamp is usually disposed in the recess formed by the "U" shaped jaw and hence is not easily accessible for visual inspection or measurement with special wear gauges. The problem of effective cam tooth wear measurement is aggravated by the low light conditions often found in material storage areas in warehouses or factories. Accordingly, there is a need to provide a convenient wear indicating system which can be read in low light conditions or by touch. Such wear indicating system should reveal the condition of the rounded serrations or teeth between lifting operations. Finally, such measurement system should not require that the lifting clamp be disassembled or that any special measuring tools be used.

SUMMARY OF THE INVENTION

The present invention provides an improved material handling apparatus, specifically a lifting clamp for plates, structural elements or the like. The lifting clamp is of the type which includes integral rounded serrations or teeth with improved means for visually detecting tooth wear without the use of special equipment or measuring devices.

In accordance with the present invention a predetermined wear pattern develops on each tooth during use. By the addition of gauge marks on the teeth the wear pattern may be conveniently observed or felt without the need for disassembly of the clamp or special measuring instruments to determine when the rounded cam teeth have worn to a degree requiring cam replacement. When the worn surface meets the gauge marks, it is time to replace the cam in the lifting clamp.

BRIEF DESCRIPTION OF THE DRAWING

FIG. 1 is a side elevation of a lifting clamp in accordance with the present invention;

FIG. 2 is a detail side elevational view of an improved cam for use with the lifting clamp shown in FIG. 1;

FIG. 3 is a detail view showing the preferred position of a tooth when gripping or clamping a metal plate in the unworn position versus a somewhat worn condition of the tooth crest;

FIG. 4 is a detail section view taken along line 4—4 of FIG. 2; and FIG. 5 is a developed plan view of some of the rounded teeth of the cam illustrated in FIGS. 2 and 4 showing a measurable wear pattern developing on certain teeth.

DESCRIPTION OF THE PREFERRED EMBODIMENTS

In the description which follows, like parts are marked throughout the specification and drawings with the same reference numerals, respectively. The drawing figures are not necessarily to scale and certain features of the invention may be shown exaggerated in scale in the interest of claritay.

Referring to FIG. 1, there is illustsrated a material handling device in the form of a lifting clamp, generally designated by the numeral 10. Lifting clamp 10 is of a type which is typically used in metal plate fabricataing and warehousing installations for lifting steel, aluminum and other types of metal plate weighing from 0.50 tons up to approximately 7.0 tons or more. Lifting clamp 10 is characterized by a generally inverted "U" shaped housing 12 formed by a pair of spaced apart jaw members 14. Jaw members 14 are aligned with each other to form a somewhat inverted "U" shaped opening 16 for receiving a metal plate 18 (shown in phantom) or other portion of a structural member. Lifting clamp 10 may be of a type known as a series "G" lifting clamp such as is made and sold under the trademark "Merrill" by the Campbell Chain Division of Cooper Industries, Inc., York, PA. Lifting clamp 10 may be used singly or in pairs and suspended from a lifting sling for lifting metal plate 18 or other structural members. Clamp 10 is typically used in a relatively harsh working environment wherein repeated use of clamp 10 causes relatively rapid wear of the working parts and in particular, the rounded serrations or teeth 26 on plate gripping cam 24.

With further reference to FIG. 1 the housing 12 is constructed such that the jaws 14 have opposed depending leg portions 20 and 22 wherein leg portion 20 is longer than leg portion 22. Lifting clamp 10 has a movable cam, generally designated by the numeral 24, which is mounted between the jaw members 14 and is pivotable about a pivot pin 25 between working and non-working positions. As shown in FIGS. 2 and 4 the profile of cam 24 approximates a circular sector. Cam 24 is provided with a plurality of rounded spaced apart parallel serrations or teeth 26 having, respectively, transversely extending sharp crests 28. Pivot pin bore 27 is provided for receiving pin 25 and is eccentric with respect to the radius center of an arcuate rim formed by teeth 26. Teeth 26 are arranged relative to pivot axis 30 of cam 24 such that successive teeth make a preferred gripping angle in engagement with a metal plate over a range of plate widths which are predetermined by selection of the width of the opening 16 in housing 12 and hence the grip range size of clamp 10.

Cam 24 is somewhat self energizing in gripping plate 18 between a serrated pad 32, FIG. 1, and rounded cam teeth 26. Connecting link 34, as shown in FIGS. 1 and 2, is pivotally connected to cam 24 at a pivot bore 36, which is spaced from the pivot axis 30. Link 34 is connected to a radius link 38 which is also mounted on the housing 12 between the jaws 14 for pivotal movement about a pivot 40. Link 38 is further pivotally connected to a lifting member 42 which, in turn, is connected to a lifting chain 44 or other lifting means (not shown). Links 34, 38 and member 42 are operative to effect movement of cam 24 into a plate gripping position. In response to a lifting force on member 42, cam 24 is biased into ever tighter gripping engagement with plate 18 as a lifting force is exerted on clamp 10 to lift plate 18.

Lifting clamp 10 may also be provided with a torsion coil spring, generally designated by the numeral 46, which is disposed around a hub portion of cam 24 and is operable to bias cam 24 into a plate gripping position, at all times. Those skilled in the art will appreciate that the position of cam 24, as urged by spring 46, to close over opening 16 further aggravates the relatively rapid wear experienced on rounded serrations or teeth 26. In any usage of clamp 10, cam 24 is engaged by plate 18 or other member to be gripped by clamp 10 as the member is inserted into opening 16. This type of action can result in high impact as well as rapid wear type forces being exerted or imparted to teeth 26 on cam 24 during normal use.

The geometry of rounded teeth 26 as regards pivot axis 30 if of some importance to achieving a suitable gripping engagement of a plate such as plate 18. As illustrated in FIG. 3, preferably, each tooth 26 has opposed planara flanks 47 and 48 which intersect to form rounded crest 28. Crest 28, forming a somewhat sharp edge and typically being heat treated hardened steel, forcibly engages and penetrates the surface of plate 18 during the gripping thereof. Crest 28 is, however, subject to rapid wear, depending on the operating environment and care with which clamp 10 is utilized. After repeated use a somewhat flattened surface 50 is formed on the top of each tooth 26. The formation of flattened surface 50 may actually be somewhat more irregular than illustrated in FIG. 3 and the intersections of flanks 47 and 48 with surface 50 may be somewhat rounded in shape as opposed to the relatively sharp edges illustrated in FIG. 3. In any case, as rounded sharp crest edge 28 wears away, a relatively flat surface such as surface 50 is formed.

In this regard it is desirable to avoid the detriments of excessive wear of the cam gripping teeth 26 by preferably providing each tooth 26 with wear indicator gauge marks 55 as illustrated in FIGS. 4 and 5. Gauge marks 55 consist of two slits placed on either side of rounded crest 28 extending normal to crest 28 into tooth 26 to a depth sufficient to make gauge marks 55 clearly visible or sensed by touch. Gauge marks 55 should be easily viewable when cam 24 is in use or when clamp 10 has released its engagement with a plate or other structural member since, as indicated by a working position of cam 24 in FIG. 1, a substantial number of working teeth may be easily viewed as cam 24 pivots into a non-working position when a plate or other member is removed from opening 16. Accordingly, visual inspection is easily obtained even if only one tooth 26 is excessively worn due to repeated use of clamp 10 with plates of equal width. If, upon casual visual inspection, it is observed that worn spot 50 approaches gauge marks 55 it is indicated that cam 24 should be replaced in order to minimize the chance of malfunction of clamp 10. If minimal light exists it is possible to feel the distance between worn spot 50 and gauge marks 55. When worn spot 50 touches one or both of gauge marks 55, cam 24 should be replaced.

Thanks to the curvature of crests 28, as illustrated in FIG. 4, progressive wear on teeth 26 will generate somewhat oval or elliptical shaped surfaces 50, as illustrated in FIG. 5. When one or both of the extents of the somewhat oval wear surfaces 50 reach gauge marks 55, it is indicated that cam 64 should be replaced to minimize problems with proper functioning of plate clamp 10. Due to the relatively easy manner in which the cams 24 may be viewed, particularly when placed in a non-working position when the clamp is empty, the amount of wear incurred by one or more of teeth 26 may be conveniently measured by merely observing or feeling the position of oval 50 with respect to gauge marks 55. Accordingly, if any tooth 26 has a sufficiently large wear surface 50 with respect to gauge marks 55, it is indicated that cam 24 should be replaced. The provision of a curved crest edge 28 for each of the working teeth 26 provides for the unique configuration and easily recognizable shape of the wear surface which will alert the user of plate clamp 10 that cam 24 should be replaced.

Accordingly, there is now provided by the lifting clamp of the present invention a wear indicating system which will indicate to the user that the gripping teeth on the cam surface have been worn to an unacceptable level. Such wear indicating system can be used without disassembling the clamp or without the need to employ special measuring tools.

Although preferred embodiments of the present invention have been described herein those skilled in the art will recognize that various substitutions and modifications may be made to the specific tooth configuration and method of determining excessive wear in a material handling and lifting clamp of the type described without departing from the scope and spirit of the invention as recited in the appended claims.

What is claimed is:

1. A lifting clamp for lifting metal plates or other structural elements comprising:
- a clamp housing including means forming a "U" shaped recess for receiving a portion of metal plate or other structural elements;
- a plate gripping cam pivotally mounted within said clamp housing for movement into gripping engagements with said metal plate or other structural elements and for securing the metal plate or other structural elements to said clamp housing between said plate gripping cam and said clamp housing;
- said plate gripping cam including a plurality of spaced apart rounded plate gripping teeth arranged along an arcuate rim of said plate gripping cam with respect to an axis of rotation of said plate gripping cam;
- said spaced apart rounded plate gripping teeth including a crested edge extending generally in a plane parallel to said axis of rotation and at least selected ones of said teeth each having gauge marks formed in said crested edge which may be viewed from the exterior of said lifting clamp at least when a metal plate or other structural element are not disposed in said "U" shaped recess;
- said gauge marks providing means to determine tooth wear in a way such that as said teeth are worn such that said crested edge is diminished the worn crested edge on said teeth will contact said gauge marks;
- whereby an indication will be given that the plate gripping cam should be replaced.

2. A lifting clamp for lifting metal plate or other structural elements comprising:
- a clamp housing including means forming a "U" shaped recess for receiving a portion of a metal plate member or a structural element;
- a plate gripping cam pivotally mounted on said housing for movement into gripping engagement with said metal plate or other structural element for securing said metal plate or other structural element to said housing;
- said plate gripping cam including a plurality of rounded spaced apart plate or structural element gripping teeth arranged along an arcuate rim of said plate gripping cam with respect to an axis of rotation of said plate gripping cam, at least selected ones of said rounded teeth including a crest extending generally in a plane parallel to said axis of rotation;
- each of said teeth having gauge marks formed in said crest located to be viewable from the exterior of the lifting clamp;
- said gauge marks providing wear indication in a way such that as said crest is worn such that said crest is diminished, the worn crest will contact said gauge marks indicating excessive wear of one or more plate gripping teeth.

3. A method for determining excessive wear on a cam for a lifting clamp comprising the steps of;
- providing a plate lifting clamp including:
  - a clamp housing including means forming a recess for receiving a portion of a metal plate member or the like,
  - a plate gripping cam pivotally mounted in said housing for movement into gripping engagement with said metal plate member or the like for securing said metal plate member or the like to said clamp housing,
  - said plate gripping cam including a plurality of rounded spaced apart plate gripping teeth arranged along a rim of said plate gripping cam with respect to an axis of rotation of said plate gripping cam,
  - at least selected ones of said rounded spaced apart plate gripping teeth including a rounded crest edge extending generally in a plane parallel to said axis of rotation and having a curvature whereby said rounded spaced apart plate gripping teeth wear toward said axis to form a generally planar oval surface;
- inspecting said rounded crest edge from time to time to determine the existence of said generally planar oval surface; and
- comparing said generally planar oval surface to a plurality of integral gauge marks formed in said plate gripping teeth to determine the extent of wear on said plate gripping teeth.

* * * * *